United States Patent [19]

Kubota

[11] Patent Number: 5,974,381
[45] Date of Patent: Oct. 26, 1999

[54] METHOD AND SYSTEM FOR EFFICIENTLY AVOIDING PARTIAL MATCHING IN VOICE RECOGNITION

[75] Inventor: Syuji Kubota, Kanagawa, Japan

[73] Assignee: Ricoh Company, Ltd., Japan

[21] Appl. No.: 08/995,258

[22] Filed: Dec. 19, 1997

[30] Foreign Application Priority Data

Dec. 26, 1996 [JP] Japan ................................. 8-357403

[51] Int. Cl.⁶ ............................... G10L 5/06; G10L 9/00
[52] U.S. Cl. .......................... 704/253; 704/251; 704/248; 704/246
[58] Field of Search .................................. 704/246, 248, 704/251, 253

[56] References Cited

U.S. PATENT DOCUMENTS

| | | | |
|---|---|---|---|
| 4,530,110 | 7/1985 | Nojiri | 704/251 |
| 4,596,031 | 6/1986 | Hakaridani | 704/246 |
| 4,667,341 | 5/1987 | Watari | 704/251 |
| 5,305,422 | 4/1994 | Junqua | 704/251 |

FOREIGN PATENT DOCUMENTS

| | | |
|---|---|---|
| 4-362699 | 12/1992 | Japan . |
| 5-127696 | 5/1993 | Japan . |
| 9-50292 | 2/1997 | Japan . |

*Primary Examiner*—David R. Hudspeth
*Assistant Examiner*—Robert Louis Sax
*Attorney, Agent, or Firm*—Knoble & Yoshida LLC

[57] ABSTRACT

To avoid a predetermined amount of time and or a certain amount of processing time prior to determining a number of frames for each speech input portion, a fast voice recognition system enables real-time frame counting based upon a comparison between a decreasing number of frames and an increasing time-dependent threshold. The real-time voice recognition also enables a substantially reduced rate for erroneous partial matching.

34 Claims, 3 Drawing Sheets

FIG. 2B SIMILARITY

FIG. 2C FRAMES

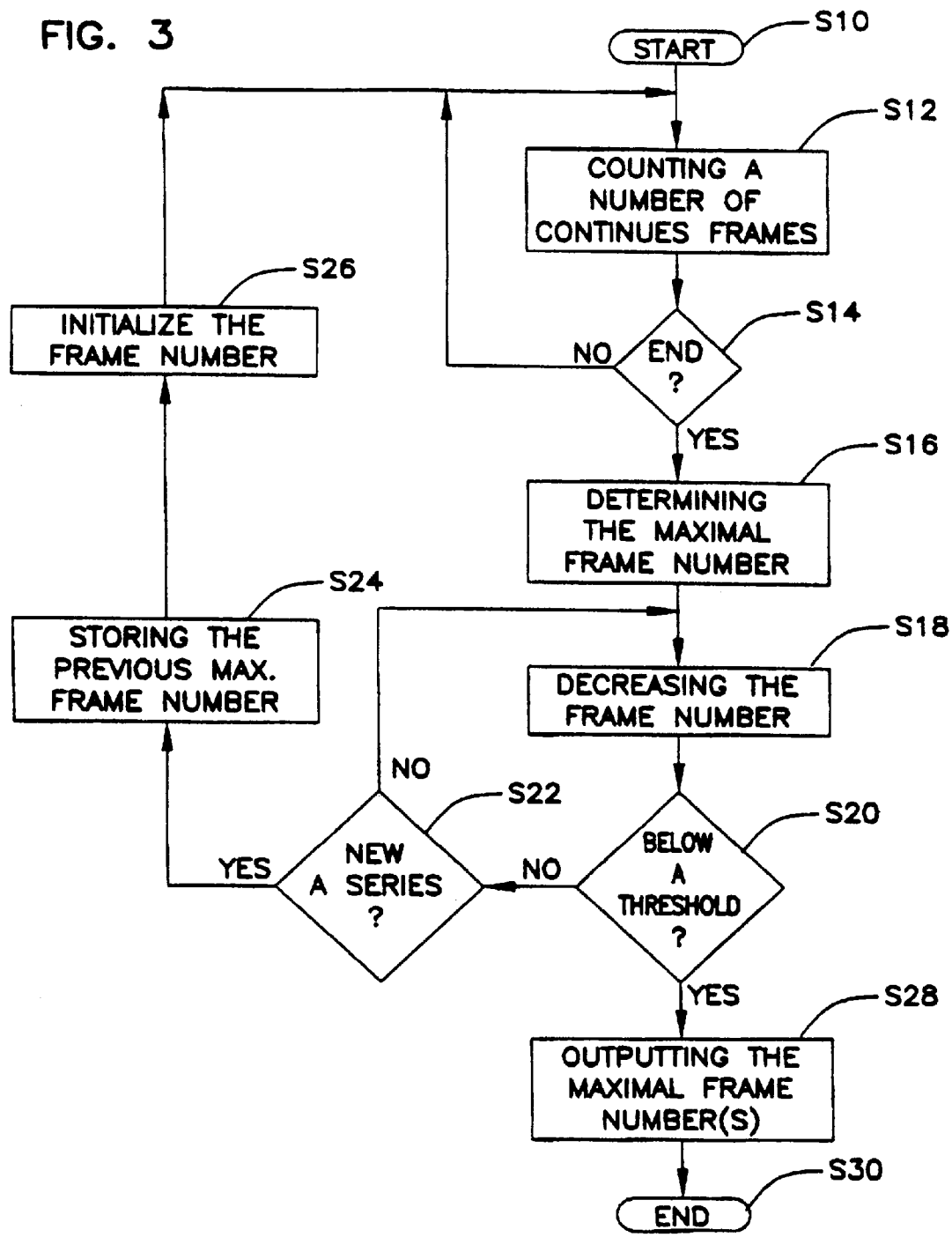

METHOD AND SYSTEM FOR EFFICIENTLY AVOIDING PARTIAL MATCHING IN VOICE RECOGNITION

FIELD OF THE INVENTION

The current invention is generally related to a method and a system for efficiently avoiding partial matching problems in voice recognition, and more particularly related to a method and a system for efficiently determining a number of frames and substantially avoiding a partial match based upon the number of frames in the matches.

BACKGROUND OF THE INVENTION

Prior art approach includes a word spotting technique as disclosed in Japanese Patent 4-362699. In general, word spotting generally does not rely upon a particular pair of speech event boundaries. In other words, in a pure word spotting approach, all possible beginnings and endings are implicitly selected and are considered for the pattern-matching and recognition-decision process. For example, a continuous dynamic programming matching technique (a DP matching) continuously adjusts input data in the time domain to enhance matching results. In the word spotting approach, the best matching result is defined to have a minimal DP value between input voice data and standard voice pattern data. To determine a speech or word portion in voice data, the minimal DP value point is back tracked to a beginning point.

The word spotting technique in general has a partial matching problem. In other words, a portion of the whole word is matched, and the partial match is erroneously recognized as an output. For example, if a Japanese word "roku" meaning a number six is inputted for voice recognition, the word spotting technique finds at least two matches including the entire word "roku" and a partial match "ku," meaning a number nine. According to one experiment as disclosed in Japanese Patent Hei 4-362699, "roku" has a DP value of 3.51 while ku has a DP value of 3.34. Thus, a partial match, "ku" is erroneously selected as the best match.

In order to correct the above described partial match artifact, the DP values are weighed according to the length of the match according to Japanese Patent Hei 4-362699. The DP values are multiplied by a weight value which has a smaller value for a shorter match. As a result of the multiplications, the weighted or corrected DP values for the two matches in the above example are now reversed, and the entire word "roku" is now correctly recognized for an output.

According to a second prior art approach, Japanese Patent Hei 5-127696 discloses a corrective method using a statistical tendency for similarity based upon the length of a match. In other words, the length of input data is determined, and a similarity between the input data and standard data is calculated. These pairs of the values are considered as an original data set. Based upon the original data set, a statistical tendency is determined between the two parameters and the second comparison standard data is generated. The input data is then compared against the second comparison standard data so as to reduce the erroneous partial matching results.

According to a third prior art approach, Japanese Patent Application JP95-00379 disclosed a technique for reducing erroneous partial matching problems in word spotting based upon a number of frames. According to this technique, the number of frames is conventionally determined if a similarity between input data and standard data is above a predetermined threshold. If clusters of continuous frames are independent or non-overlapping with each other, each cluster is used to recognize a voice output and the recognized standard is outputted as a voice recognition result. On the other hand, if the continuous frame clusters are overlapping with each other, the length of each cluster is compared for selecting the longest frame cluster as a voice recognition result. In case of the same length or tie in the frame cluster length, the cluster with a higher similarity value is selected.

In view of the above described prior art approaches, an efficient technique for determining a number of continuous frames for each input data is desired for a real-time voice recognition. To conventionally determine the frame length, in general, the number of frames is determined in a retroactive fashion after a certain predetermined period of silence is confirmed in the input voice data. That is, the path is retraced in input voice data to count a number of frames. Further more, in determining a speech boundary using the power or zerocrossing information, a speech ending must be first determined. In any case, either of the above techniques requires a predetermined amount of time and or a certain amount of processing time. For these and other reasons, it is difficult to implement a fast voice recognition system without a real-time frame counting technique and let alone, a real-time voice recognition with a substantially reduced rate for erroneous partial matching.

SUMMARY OF THE INVENTION

In order to solve the above and other problems, according to a first aspect of the current invention, A method of determining a number of frames for each match between input voice data and standard voice data, each of the frames having a predetermined time unit, including the steps of: a) inputting the input voice data; b) comparing the input voice data against the standard voice data for determining a similarity; c) incrementing a number of the frames for a continuous frame in the input voice data; d) determining a maximal number of the frames for the input voice data based upon the number of frames prior to a mismatch between the frames in the standard voice data and the input voice data; and e) outputting the maximal number of the frames.

According to a second aspect of the current invention, a system for determining a number of frames for each match between input voice data and standard voice data in voice recognition, including: an input unit for inputting the input voice data formatted in frames; a comparison unit connected to the input unit for comparing the input voice data against the standard voice data for determining a similarity; a frame calculation unit connected to the comparison unit for incrementing a number of the frames upon a continuous frame in the input voice data and for determining a maximal frame number based upon the number of frames prior to a mismatch between the frames in the standard voice data and the input voice data; and an output unit connected to the frame calculation unit and the comparison unit for outputting the maximal frame number.

According to a third aspect of the current invention, a recording medium containing a computer program for substantially eliminating a partial matching artifact in voice recognition, including the steps of: i) inputting input voice data formatted in frames each having a predetermined size of time unit; ii) comparing the input voice data against standard voice data formatted in frames each having the same predetermined size of time unit; iii) incrementing a number of the frames upon a continuous match between the frames in the standard voice data and the input voice data; iv) determining a maximal number of the frames for the continuous match based upon the number of frames prior to a mismatch between the frames in the standard voice data and the input voice data; v) decrementing the number of the frames upon a mismatch between the frames in the standard voice data and the input voice data; vi) repeating the steps ii) through v) until the number of the frames decreases below a time-dependent threshold; and vii) outputting a set of the maximal numbers of the frames subsequent to the step vi).

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIGS. 2A, 2B and 2C respectively illustrate an input voice data, a similarity between the input voice data and corresponding standard voice data, and a number of frames in relation to a time-dependent threshold.

FIG. 3 is a flow chart illustrating steps involved in a preferred process of voice recognition according to the current invention.

DETAILED DESCRIPTION OF THE PREFERRED EMBODIMENT(S)

Figure 1:
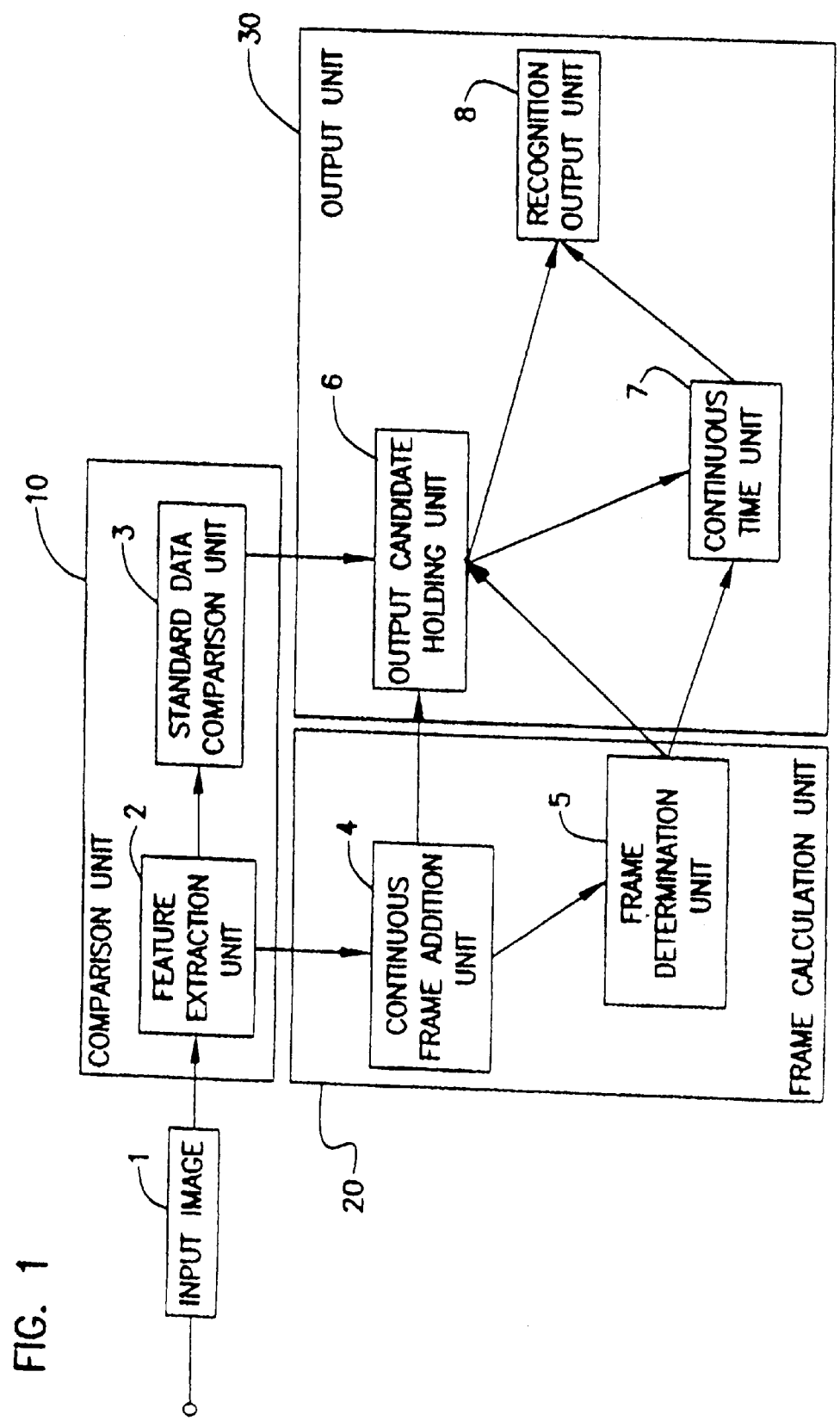
FIG. 1 illustrates a preferred embodiment of the voice recognition system according to the current invention.

Referring now to the drawings, wherein like reference numerals designate corresponding structure throughout the views, and referring in particular to FIG. 1, one preferred embodiment of the real-time voice recognition system according to the current invention includes an input unit 1 for inputting voice data such as a microphone and a comparison unit 10 for comparing the input voice data to standard voice data so as to generate similarity data, a frame calculation unit 20 for determining a number of continuous frames or frame data in the input voice data and an output unit for outputting a recognition result based upon the similarity data and the frame data.

Still referring to FIG. 1, in particular, the comparison unit 10 further includes a feature extraction unit for extracting a set of certain features such as a continuous time and a feature vector for each frame of the input voice data. The comparison unit 10 further also includes a standard data comparison unit 3 for comparing the above described extracted features to standard voice data which has been stored in a predetermined dictionary. The standard data comparison unit 3 determines a similarity value for each transition point of the input voice data, and based upon a cumulative similarity value, candidates of standard patterns or voice data are selected for further processing prior to outputting a voice recognition result.

The frame calculation unit 20 further includes a continuous frame addition unit 4 and a frame determination unit 5. Based upon Duration Based State Transition (DST) Model, the continuous frame addition unit 4 counts a number of frames and adds these frames in a substantially identical state where a characteristic vector is stable. Thus, the continuous frame addition unit 4 determines a continuous frame length. Each frame has a predetermined duration. The above determined continuous frame length is outputted into an output candidate holding unit 6 of the output unit 30. The detail description of DST Model is hereby incorporated by external reference to "Isolated Spoken Word Recognition by Duration Based State Transition Models," Journal of Electronics Information Communication, 1769-77, Vol.J72-D11 (1989).

The frame determination unit 5 determines a maximal number of frames and updates the maximal number of frames until a final state of the input voice data is reached. Since an input word has branching paths from an initial state to a final state and the paths each have a different length, a continuous maximal number of frames changes at various points of the input word. In the final state, if similarity exceeds a predetermined threshold value $\alpha$, the updated maximal number of frames is outputted to the output candidate holding unit 6 of the output unit 30.

The output unit 30 further includes an output candidate holding unit 6 for holding the candidates for voice recognition which includes outputs from the standard data comparison unit 3 and the continuous frame addition unit 4, a continuous time unit 7 for determining whether the number of frames has decreased below a time-dependent threshold level, and a recognition output unit 8 for finally determining a voice recognition result and for outputting the result. The continuous time unit 7 generates a predetermined time-dependent threshold signal immediately after the maximal number of frames has been determined. While the number of frames decreases, the time-dependent threshold signal increases at a predetermined rate. When the number of frames and the time-dependent threshold signal cross with each other, the continuous time unit 7 generates an output ready signal to the recognition output unit 8. Upon receiving the output ready signal, the recognition output unit 8 outputs the voice recognition result without further processing if there is only one candidate. On the other hand, if there is more than one candidate, the recognition output unit 8 generally selects one with the largest maximal frame number.

Figure 2A:
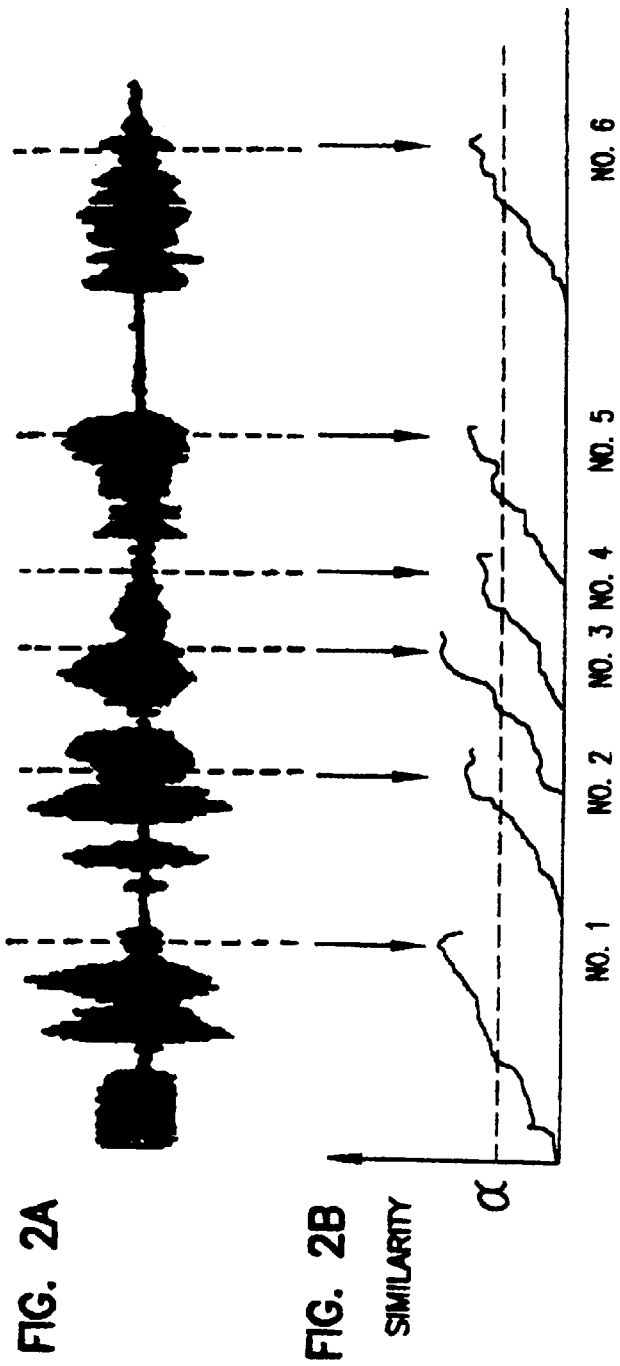
Figure 2A:
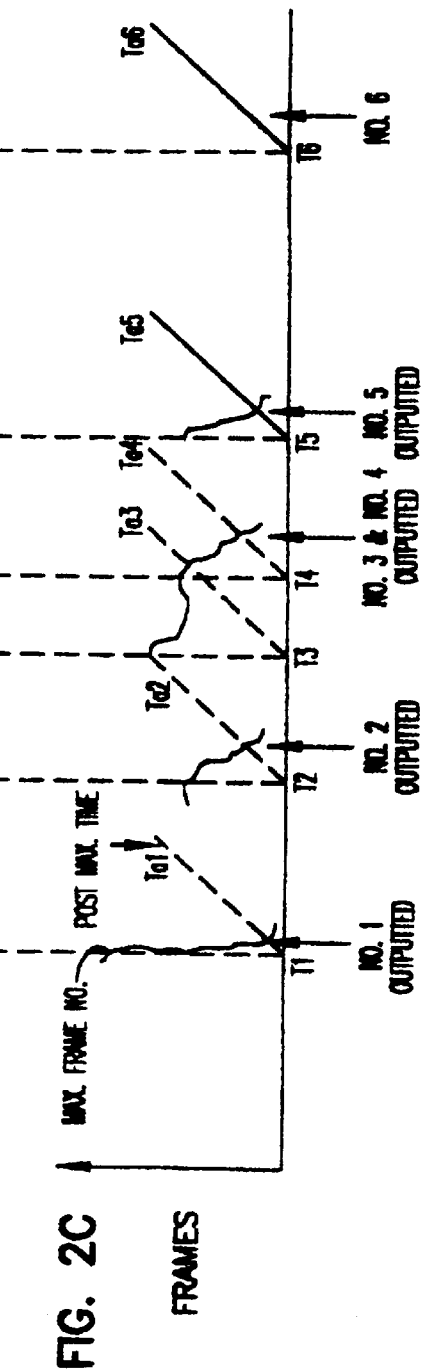

Referring to FIGS. 2A, 2B and 2C, the operation of the above described preferred embodiment according to the current invention is illustrated with an exemplary voice input. FIG. 2A illustrates a voice input with a horizontal axis being time and a vertical axis being intensity of a predetermined unit. FIG. 2B illustrates similarity of the same voice input signal with respect to the corresponding standard voice data or patterns. Portions of the input voice data each end in a final state where the similarity value is the highest within each of the portions. These highest similarity points or final states are respectively marked by the vertical arrows in FIGS. 2A and 2B. Referring to FIG. 2C, as the similarity value approaches the max value at the final state, a number of continuous frame for each state is accumulated from an initial state. The number of frames also reaches the maximal frame number at the maximal similarity point as indicated by the dotted line for each of the input voice portions. As soon as the maximal frame number is determined, a time-dependent threshold Ta1 is initiated at a time point T1 from zero frame number and increases at a predetermined rate. On the other hand, the number of continuous frames decreases after the maximal number is determined since the similarity decreases. For example, when the decreasing number of the frames reaches the time-dependent threshold Ta1, the maximal frame number No. 1 is outputted. Similarly, for input portions Nos. 2, 5 and 6, the corresponding frame numbers are outputted in the above described manner.

Still referring to FIG. 2C, the above described output timing is slightly different for a certain situation where input voice data has overlapping voice portions. In other words, more than one recognition candidate is partially overlapping in the time domain. The overlapping situation generally means that the input voice data contains at least one partial match. For example, No. 3 and No. 4 portions of the input voice data contains a partial match. The partial match exists since the No. 4 portion reaches the maximal frame number at T1 before the number of frames for the No. 3 portion becomes below a time-dependent threshold starting at T0. When the frame number of the No. 4 portion reaches the second time-dependent threshold, both the No. 3 and 4 frame numbers are outputted at the same time. The earlier No. 3 portion maximal frame number was prevented from immediately being outputted. Similarly, if more than two input portions are overlapping, their maximal frame numbers are outputted in the above described manner.

Now referring to FIG. 3, a flow chart illustrates steps involved in a preferred process of outputting a maximal frame number for each voice input portion according to the current invention. In a step S10, the preferred process starts, and a number of continuous frames is being added in a Step 12. A similarity value is determined between input voice data and standard voice data. When the similarity value reaches a final state, if the similarity value is above a predetermined value α in a Step 14, a maximal frame number is determined in a Step 16. On the other hand, if the above end conditions are not met, the frame number is being continuously counted. After the maximal frame number is determined, the frame number is generally decreased in a Step 18 due to dissimilarity between the input voice data and the standard voice data. In a Step 20, it is determined whether the number of frames has reached below a predetermined time-dependent threshold. If the above condition is not met, it is then determined whether a new series or a new maximal frame number has been determined. If no new maximal frame number has been detected, the flow repeats the Step 18. On the other hand, if a new maximal frame number has been determined, the previous maximal number is stored in a Step 24 and the number of frames is initialized to zero in a Step 26 so that the process repeats from the Step 12. Finally, when the number of frames has reached below a predetermined timedependent threshold in the Step 20, the maximal frame number is outputted in a Step 28. In case more than one maximal frame number is available, all of the stored maximal frame numbers are outputted at the same time in the Step 28 before the process ends in a Step 30.

It is to be understood, however, that even though numerous characteristics and advantages of the present invention have been set forth in the foregoing description, together with details of the structure and function of the invention, the disclosure is illustrative only, and that although changes may be made in detail, especially in matters of shape, size and arrangement of parts, as well as implementation in software, hardware, or a combination of both, the changes are within the principles of the invention to the full extent indicated by the broad general meaning of the terms in which the appended claims are expressed.

What is claimed is:

1. A method of determining a number of frames for each match between input voice data and standard voice data, each of the frames having a predetermined time unit, comprising the steps of:

a) inputting the input voice data;

b) comparing the input voice data against the standard voice data for determining a similarity;

c) incrementing a number of the frames for a continuous frame in the input voice data;

d) determining a maximal number of the frames for the input voice data based upon the number of frames prior to a mismatch between the frames in the standard voice data and the input voice data;

d') decrementing the number of the frames upon a mismatch between the frames in the standard voice data and the input voice data; and e) outputting the maximal number of the frames if the number of the frames decreases below a time-dependent threshold.

2. The method of determining a number of frames according to claim 1 further comprising an additional step h) of recognizing the input voice data at least in part based upon the maximal number of the frames.

3. The method of determining a number of frames according to claim 1 wherein said step e) outputs the maximal number of the frames only if the similarity exceeds a predetermined similarity threshold at a time when the maximal number of the frames is determined.

4. The method of determining a number of frames according to claim 1 wherein said time-dependent threshold increases after said step d).

5. The method of determining a number of frames according to claim 4 wherein said time-dependent threshold linearly increases.

6. The method of determining a number of frames according to claim 1 wherein said predetermined time unit for each frame is approximately 10 milliseconds.

7. The method of determining a number of frames according to claim 1 wherein said predetermined time unit for each frame is approximately 20 milliseconds.

8. The method of determining a number of frames according to claim 1 wherein said steps a) through g) are performed in real time.

9. A method of substantially eliminating a partial matching artifact in voice recognition, comprising the steps of:

i) inputting input voice data formatted in frames each having a predetermined size of time unit;

ii) comparing the input voice data against standard voice data formatted in frames each having the same predetermined size of time unit;

iii) incrementing a number of the frames for a continuous frame in the input voice data;

iv) determining a maximal number of the frames for the input voice data based upon the number of frames prior to a mismatch between the frames in the standard voice data and the input voice data;

v) decrementing the number of the frames upon a mismatch between the frames in the standard voice data and the input voice data;

vi) repeating said steps ii) through v) until the number of the frames decreases below a time-dependent threshold; and vii) outputting a set of the maximal numbers of the frames subsequent to said step vi).

10. The method of substantially eliminating a partial matching artifact according to claim 9 further comprising an additional step viii) of recognizing the input voice data at least in part based upon said set of the maximal numbers of the frames.

11. The method of substantially eliminating a partial matching artifact according to claim 10 wherein a larger of the maximal numbers is selected for voice recognition of the input voice data.

12. The method of substantially eliminating a partial matching artifact according to claim 9 wherein said step vi) initializes the number of the frames to zero after said maximal number of the frames is determined.

13. The method of substantially eliminating a partial matching artifact according to claim 9 further comprising an additional step ix) of determining a similarity between the standard voice data and the input voice data, wherein said step iv) determines the maximal number of the frames only if the similarity exceeds a predetermined similarity threshold.

14. The method of substantially eliminating a partial matching artifact according to claim 9 wherein said time-dependent threshold increases after said step iv).

15. The method of substantially eliminating a partial matching artifact according to claim 14 wherein said time-dependent threshold linearly increases.

16. The method of substantially eliminating a partial matching artifact according to claim 9 wherein said predetermined time unit for each frame is approximately 10 milliseconds.

17. The method of substantially eliminating a partial matching artifact according to claim 9 wherein said predetermined time unit for each frame is approximately 20 milliseconds.

18. The method of substantially eliminating a partial matching artifact according to claim 10 wherein said steps i) through viii) are performed in real time.

19. A system for determining a number of frames for each match between input voice data and standard voice data in voice recognition, comprising:
   an input unit for inputting the input voice data formatted in frames;
   a comparison unit connected to said input unit for comparing the input voice data against the standard voice data for determining a similarity;
   a frame calculation unit connected to said comparison unit and further comprising a continuous frame addition unit for incrementing a number of the frames upon a continuous frame in the input voice data and a frame determination unit connected to said continuous frame addition unit for determining a maximal frame number and for decrementing the number of the frames upon a mismatch between the frames in the standard voice data and the input voice data; and
   an output recognition unit connected to said frame calculation unit and said comparison unit for generating a time-dependent threshold signal and outputting the maximal number of the frames when the number of the frames decreases below the time-dependent threshold.

20. The system for determining a number of frames according to claim 19 wherein said comparison unit further comprises:
   a feature extraction unit for extracting a feature of the input voice data; and
   a standard data comparison unit for comparing the extracted feature and that of the standard data for generating candidates for recognition.

21. The system for determining a number of frames according to claim 20 wherein said output unit further comprises:
   a recognition candidate holding unit connected to said standard data comparison unit for holding the candidates;
   a continuous frame information unit connected to said recognition candidate holding unit and said frame calculation unit for selecting one of the candidates based upon the maximal frame number; and
   a recognition output unit connected to said recognition candidate holding unit and said continuous frame information unit for outputting the selected candidate for voice recognition.

22. The system for determining a number of frames according to claim 19 wherein said recognition output unit increases said time-dependent threshold after said frame calculation unit determines the maximal frame number.

23. The system for determining a number of frames according to claim 19 wherein said recognition output unit linearly increases said time-dependent threshold.

24. The system for determining a number of frames according to claim 19 wherein said output unit outputs the maximal frame number only if the similarity exceeds a predetermined similarity threshold at a time when the maximal frame number is determined.

25. A recording medium containing a computer program for substantially eliminating a partial matching artifact in voice recognition, comprising the steps of:
   i) inputting input voice data formatted in frames each having a predetermined size of time unit;
   ii) comparing the input voice data against standard voice data formatted in frames each having the same predetermined size of time unit;
   iii) incrementing a number of the frames upon a continuous match between the frames in the standard voice data and the input voice data;
   iv) determining a maximal number of the frames for the continuous match based upon the number of frames prior to a mismatch between the frames in the standard voice data and the input voice data;
   v) decrementing the number of the frames upon a mismatch between the frames in the standard voice data and the input voice data;
   vi) repeating said steps ii) through v) until the number of the frames decreases below a time-dependent threshold; and
   vii) outputting a set of the maximal numbers of the frames subsequent to said step vi).

26. The recording medium containing a computer program for substantially eliminating a partial matching artifact according to claim 9 further comprising an additional step viii) of recognizing the input voice data at least in part based upon said set of the maximal numbers of the frames.

27. The recording medium containing a computer program for substantially eliminating a partial matching artifact according to claim 10 wherein a larger of the maximal numbers is selected for voice recognition of the input voice data.

28. The recording medium containing a computer program for substantially eliminating a partial matching artifact according to claim 9 wherein said step vi) initializes the number of the frames to zero after said maximal number of the frames is determined.

29. The recording medium containing a computer program for substantially eliminating a partial matching artifact according to claim 9 further comprising an additional step ix) of determining a similarity between the standard voice data and the input voice data, wherein said step iv) determines the maximal number of the frames only if the similarity exceeds a predetermined similarity threshold.

30. The recording medium containing a computer program for substantially eliminating a partial matching artifact according to claim 9 wherein said time-dependent threshold increases after said step iv).

31. The recording medium containing a computer program for substantially eliminating a partial matching artifact according to claim 14 wherein said time-dependent threshold linearly increases.

32. The recording medium containing a computer program for substantially eliminating a partial matching artifact according to claim 10 wherein said predetermined time unit for each frame is approximately 10 milliseconds.

33. The recording medium containing a computer program for substantially eliminating a partial matching artifact according to claim 9 wherein said predetermined time unit for each frame is approximately 20 milliseconds.

34. The recording medium containing a computer program for substantially eliminating a partial matching artifact according to claim 10 wherein said steps i) through viii) are performed in real time.

* * * * *